(12) United States Patent
Berndt et al.

(10) Patent No.: US 9,626,966 B2
(45) Date of Patent: Apr. 18, 2017

(54) VOICE RECOGNITION QUERY RESPONSE SYSTEMS AND METHODS FOR GENERATING QUERY RESPONSES USING INFORMATION FROM A VEHICLE

(71) Applicant: Harman International Industries, Incorporated, Stamford, CT (US)

(72) Inventors: Joshua Berndt, South Lyon, MI (US); Tirtha Roy, Lake Zurich, IL (US); Michael Sieczko, Lake in the Hills, IL (US); Joshua Slominski, Farmington Hills, MI (US); Chandra Kant, Bihar (IN)

(73) Assignee: Harman International Industries, Incorporated, Stamford, CT (US)

( * ) Notice: Subject to any disclaimer, the term of this patent is extended or adjusted under 35 U.S.C. 154(b) by 186 days.

(21) Appl. No.: 14/575,790

(22) Filed: Dec. 18, 2014

(65) Prior Publication Data
US 2015/0170653 A1    Jun. 18, 2015

Related U.S. Application Data

(60) Provisional application No. 61/917,883, filed on Dec. 18, 2013.

(51) Int. Cl.
*G10L 17/22* (2013.01)
*G10L 15/22* (2006.01)

(52) U.S. Cl.
CPC .................................. *G10L 15/22* (2013.01)

(58) Field of Classification Search
CPC ..................................................... G10L 15/22
See application file for complete search history.

(56) References Cited

U.S. PATENT DOCUMENTS

| 8,423,362 | B2 | 4/2013 | Chengalvarayan et al. |
| 8,548,806 | B2 | 10/2013 | Nagashima |
| 2004/0082350 | A1* | 4/2004 | Chen ...................... H04L 63/10 455/518 |
| 2007/0050191 | A1 | 3/2007 | Weider et al. |

(Continued)

OTHER PUBLICATIONS

"Project: PyAIML: Summary," SourceForge.net Website, Available at http://sourceforge.net/projects/pyaiml/, Available as Early as May 20, 2004, 2 pages.

(Continued)

*Primary Examiner* — Qian Yang
(74) *Attorney, Agent, or Firm* — McCoy Russell LLP

(57) ABSTRACT

Embodiments are disclosed for an in-vehicle computing system comprising a communication interface communicatively coupled to a query response server, a processor, and a storage device. The storage device configured to collect and store vehicle and user interaction data and configured to store instructions executable by the processor to receive a voice query from a user, translate the voice query into a text query, send the text query to a query response server, receive a result from the query response server, the result including one or more placeholders representing data to be retrieved from a storage device local to the head unit, replace the one or more placeholders with information from the storage device to form an updated result; and present the updated result to the user.

19 Claims, 10 Drawing Sheets

(56) References Cited

U.S. PATENT DOCUMENTS

| | | | |
|---|---|---|---|
| 2011/0153324 A1* | 6/2011 | Ballinger | G10L 15/30 704/235 |
| 2013/0185072 A1 | 7/2013 | Huang et al. | |
| 2013/0275875 A1 | 10/2013 | Gruber et al. | |
| 2013/0275899 A1 | 10/2013 | Schubert et al. | |
| 2013/0325478 A1* | 12/2013 | Matsumoto | B60W 50/08 704/274 |
| 2014/0122056 A1* | 5/2014 | Duan | H04L 51/02 704/9 |

OTHER PUBLICATIONS

Bush, N., "Artificial Intelligence Markup Language (AIML) Version 1.0.1," A.L.I.C.E. AI Foundation Official AIML 1.0.1 Standard, Revision 8: Adopted Oct. 30, 2011, First Edition Published Aug. 3, 2001, 37 pages.

Bradesko, L. et al., "The Architecture of Future Automotive Applications based on Web Technologies," Retrieved from the Internet at http://www.w3.org/2012/11/web-and-automotive/submissions/webautomotive1_submission_24.pdf, Oct. 29, 2012, 6 pages.

European Patent Office, Extended European Search Report Issued in Application No. 14198873.3, Jul. 29, 2015, 7 pages.

\* cited by examiner

VOICE RECOGNITION QUERY RESPONSE SYSTEMS AND METHODS FOR GENERATING QUERY RESPONSES USING INFORMATION FROM A VEHICLE

CROSS-REFERENCE TO RELATED APPLICATIONS

This application claims priority to U.S. Provisional Patent Application No. 61/917,883, entitled "VOICE RECOGNITION QUERY RESPONSE SYSTEM," filed Dec. 18, 2013, the entire contents of which are hereby incorporated by reference for all purposes.

FIELD

The disclosure relates to an in-vehicle computing system for receiving queries and presenting responses to the received queries.

BACKGROUND

Vehicles and infotainment systems within vehicles continue to increase in complexity over time. Typically, a source of information for operation of vehicles and infotainment systems is found in a text-based manual. However, such manuals may be difficult to navigate and may become easily misplaced. The information in the manuals may also be static, remaining unchanged even as the vehicle ages and driver behaviors change.

SUMMARY

Embodiments are disclosed for an in-vehicle computing system comprising a communication interface communicatively coupled to a query response server, a processor, and a storage device. The storage device configured to collect and store vehicle and user interaction data and configured to store instructions executable by the processor to receive a voice query from a user, translate the voice query into a text query, send the text query to a query response server, receive a result from the query response server, the result including one or more placeholders representing data to be retrieved from a storage device local to the head unit, replace the one or more placeholders with information from the storage device to form an updated result; and present the updated result to the user.

In additional or alternative embodiments, an in-vehicle computing system comprises a communication interface communicatively coupled to a query response server, a processor, and a storage device, the storage device configured to collect and store vehicle and user interaction data and configured to store instructions executable by the processor to receive a voice query from a user, send the voice query to a voice recognition server, receive a text query from the voice recognition server, send the text query to a query response server, receive a result from the query response server, the result requesting information included in the vehicle and user interaction data, send the requested information to the query response server, receive an updated result from the query response server, and present the updated result to the user.

In one or more embodiments, a method in a head unit comprises receiving a voice query from a user, translating the voice command into a text query, sending the text query to a query response server, receiving a result from the query response server, the result including one or more placeholders representing data to be retrieved from a storage device local to the head unit, replacing the one or more placeholders with information from the storage device to form an updated result, and presenting the updated result to the user.

BRIEF DESCRIPTION OF THE DRAWINGS

The disclosure may be better understood from reading the following description of non-limiting embodiments, with reference to the attached drawings, wherein below.

DETAILED DESCRIPTION

In-vehicle computing systems may be connected to various information sources (e.g., sensors, devices, etc.) in order to combine and analyze data from these sources within a context of the vehicle status, vehicle environment, driver information, and/or other real-time contextual events or conditions. However, a user of the in-vehicle computing system may have questions regarding operation or status of the vehicle or vehicle systems, as well as questions for other topics. Posing the question to the in-vehicle computing system via voice input may be less distracting than other types of input when the user is a driver of the vehicle, and simpler to provide when the user is a driver or a passenger of the vehicle. By tailoring responses to a context of the vehicle and/or user based on information local to the in-vehicle computing system and/or a query response server, relevant content may be provided to a user of the in-vehicle computing system to answer queries of a user in a targeted manner.

Figure 1:
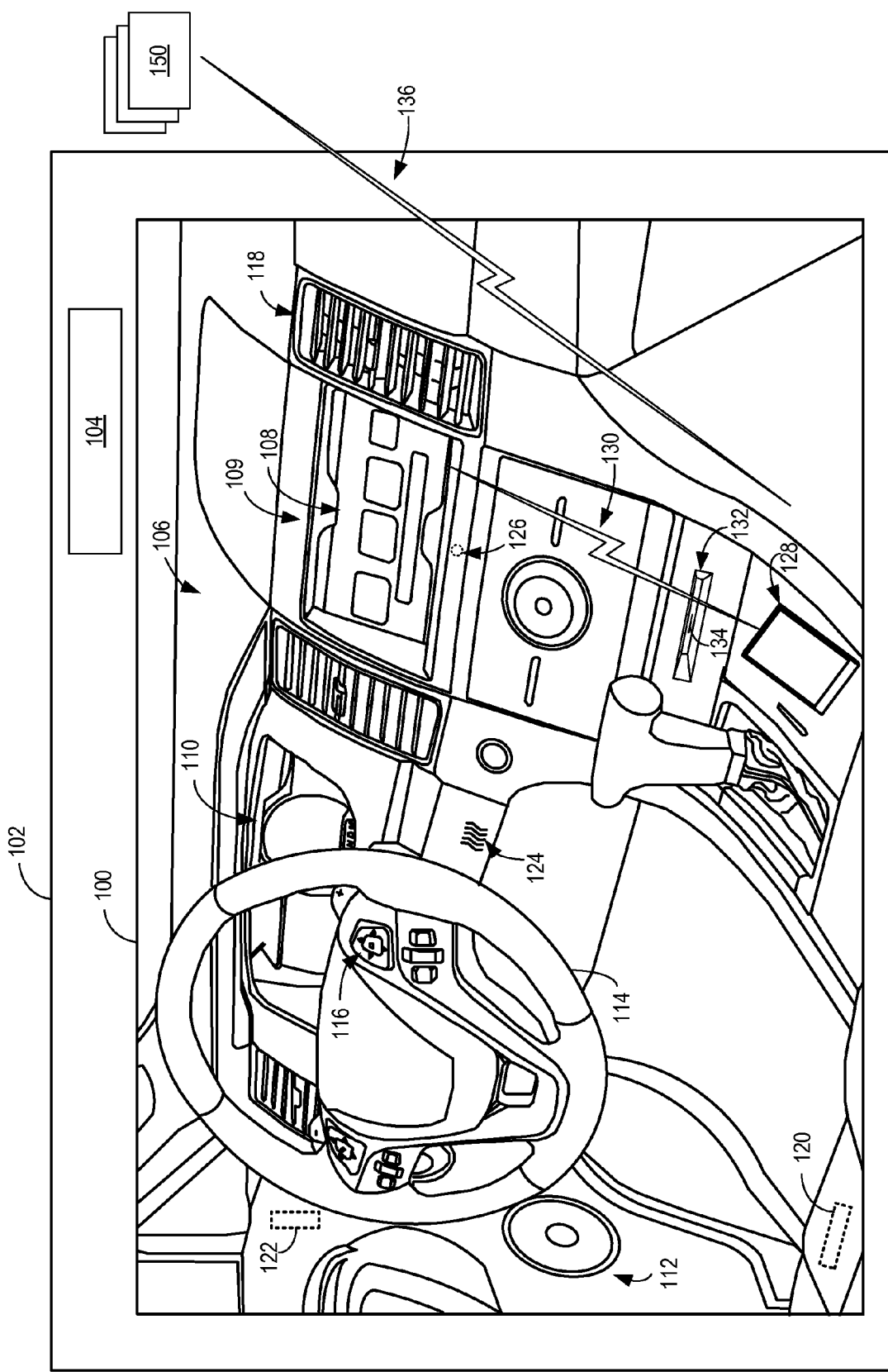
FIG. 1 is a partial view of a vehicle cabin including an in-vehicle computing system communicatively coupled to a mobile device and a wearable device, in accordance with one or more embodiments of the present disclosure.

FIG. 1 shows an example partial view of an interior of a cabin 100 of a vehicle 102, in which a driver and/or one or more passengers may be seated. Vehicle 102 of FIG. 1 may be a motor vehicle including drive wheels (not shown) and an internal combustion engine 104. Internal combustion engine 104 may include one or more combustion chambers which may receive intake air via an intake passage and exhaust combustion gases via an exhaust passage. Vehicle 102 may be a road automobile, among other types of vehicles. In some examples, vehicle 102 may include a hybrid propulsion system including an energy conversion device operable to absorb energy from vehicle motion and/or the engine and convert the absorbed energy to an energy form suitable for storage by an energy storage device. Vehicle 102 may include a fully electric vehicle, incorporating fuel cells, solar energy capturing elements, and/or other energy storage systems for powering the vehicle.

As shown, an instrument panel 106 may include various displays and controls accessible to a driver (also referred to as the user) of vehicle 102. For example, instrument panel 106 may include a touch screen 108 of an in-vehicle computing system 109 (e.g., an infotainment system), an audio system control panel, and an instrument cluster 110. While the example system shown in FIG. 1 includes audio system controls that may be performed via a user interface of in-vehicle computing system 109, such as touch screen 108 without a separate audio system control panel, in other embodiments, the vehicle may include an audio system control panel, which may include controls for a conventional vehicle audio system such as a radio, compact disc player, MP3 player, etc. The audio system controls may include features for controlling one or more aspects of audio output via speakers 112 of a vehicle speaker system. For example, the in-vehicle computing system or the audio system controls may control a volume of audio output, a distribution of sound among the individual speakers of the vehicle speaker system, an equalization of audio signals, and/or any other aspect of the audio output. In further examples, in-vehicle computing system 109 may adjust a radio station selection, a playlist selection, a source of audio input (e.g., from radio or CD or MP3), etc., based on user input received directly via touch screen 108, or based on data regarding the user (such as a physical state and/or environment of the user) received via external devices 150 and/or mobile device 128.

In some embodiments, one or more hardware elements of in-vehicle computing system 109, such as touch screen 108, a display screen, various control dials, knobs and buttons, memory, processor(s), and any interface elements (e.g., connectors or ports) may form an integrated head unit that is installed in instrument panel 106 of the vehicle. The head unit may be fixedly or removably attached in instrument panel 106. In additional or alternative embodiments, one or more hardware elements of the in-vehicle computing system may be modular and may be installed in multiple locations of the vehicle.

Instrument cluster 110 may include various gauges such as a fuel gauge, tachometer, speedometer, and odometer, as well as indicators and warning lights. A steering wheel 114 may project from the instrument panel below instrument cluster 110. Optionally, steering wheel 114 may include controls 116 which may be used in conjunction with touch screen 108 to navigate features of an in-vehicle computing system and to control the in-vehicle computing system. In addition to the components depicted in FIG. 1, it will be appreciated that instrument panel 106 may include additional components such as door and window controls, a cigarette lighter which may also be used as a low-voltage power outlet, a glove compartment, and/or any other suitable elements. In one or more embodiments, control of in-vehicle climate (such as cabin temperature) via climate control system vents 118 may be performed using touch screen 108 and thus no separate climate control interface may be included in instrument panel 106. In alternative embodiments, however, a separate climate control interface may be provided.

The cabin 100 may include one or more sensors for monitoring the vehicle, the user, and/or the environment. For example, the cabin 100 may include one or more seat-mounted pressure sensors 120 configured to measure the pressure applied to the seat to determine the presence of a user. The cabin 100 may include one or more door sensors 122 configured to monitor door activity, such as the opening and/or closing of the door, the locking of the door, the operation of a window of the door, and/or any other suitable door activity event. A humidity sensor 124 may be included to measure the humidity content of the cabin. A microphone 126 may be included to receive user input in the form of voice commands, to enable a user to conduct telephone calls, and/or to measure ambient noise in the cabin 100. It is to be understood that the placement of the sensors illustrated in FIG. 1 is exemplary, and one or more additional or alternative sensors may be positioned in any suitable location of the vehicle. For example, additional sensors may be positioned in an engine compartment, on an external surface of the vehicle, and/or in other suitable locations for providing information regarding the operation of the vehicle, ambient conditions of the vehicle, a user of the vehicle, etc. Information regarding ambient conditions of the vehicle, vehicle status, or vehicle driver may also be received from sensors external to/separate from the vehicle (that is, not part of the vehicle system), such as from sensors coupled to external devices 150 and/or mobile device 128.

Cabin 100 may also include one or more user objects, such as mobile device 128, that are stored in the vehicle before, during, and/or after travelling. The mobile device may include a smart phone, a tablet, a laptop computer, a portable media player, and/or any suitable mobile computing device. The mobile device 128 may be connected to the in-vehicle computing system via communication link 130. The communication link 130 may be wired (e.g., via Universal Serial Bus [USB], Mobile High-Definition Link [MHL], High-Definition Multimedia Interface [HDMI], etc.) or wireless (e.g., via BLUETOOTH, WI-FI, Near-Field Communication [NFC], cellular connectivity, etc.) and configured to provide two-way communication between the mobile device and the in-vehicle computing system. For example, the communication link 130 may provide sensor and/or control signals from various vehicle systems (such as vehicle audio system, climate control system, etc.) and the touch screen 108 to the mobile device 128 and may provide control and/or display signals from the mobile device 128 to the in-vehicle systems and the touch screen 108. The communication link 130 may also provide power to the mobile device 128 from an in-vehicle power source in order to charge an internal battery of the mobile device.

While the mobile device 128 is illustrated as being spatially separated from the in-vehicle computing system and connected via a substantially external communication link (e.g., a cable or radiofrequency signal), it is to be understood that a slot 132 or other storage structure may be formed in the instrument panel 106 or other location in the vehicle to hold the mobile device in a particular location. The storage structure may include an integrated connector 134 to which the mobile device 128 may be attached or "docked" for providing a substantially internal communication link between the mobile device and the computing system.

In-vehicle computing system 109 may also be communicatively coupled to additional devices operated by the user but located external to vehicle 102, such as one or more external devices 150. In the depicted embodiment, external devices 150 are located outside of vehicle 102 though it will be appreciated that in alternate embodiments, external devices may be located inside cabin 100. The external devices may include a server computing system, personal computing system, portable electronic device, electronic wrist band, electronic head band, portable music player, electronic activity tracking device, pedometer, smart-watch, GPS system, etc. External devices 150 may be connected to the in-vehicle computing system via communication link 136 which may be wired or wireless, as discussed with reference to communication link 130, and configured to provide two-way communication between the external devices and the in-vehicle computing system. For example, external devices 150 may include one or more sensors and communication link 136 may transmit sensor output from external devices 150 to in-vehicle computing system 109 and touch screen 108. External devices 150 may also store and/or receive information regarding contextual data, user behavior/preferences, operating rules, etc. and may transmit such information from the external devices 150 to in-vehicle computing system 109 and touch screen 108.

In-vehicle computing system 109 may analyze the input received from external devices 150, mobile device 128, and/or other input sources and select settings for various in-vehicle systems (such as climate control system or audio system), provide output via touch screen 108 and/or speakers 112, communicate with mobile device 128 and/or external devices 150, and/or perform other actions based on the assessment. In some embodiments, all or a portion of the assessment may be performed by the mobile device 128 and/or the external devices 150.

In some embodiments, one or more of the external devices 150 may be communicatively coupled to in-vehicle computing system 109 indirectly, via mobile device 128 and/or another of the external devices 150. For example, communication link 136 may communicatively couple external devices 150 to mobile device 128 such that output from external devices 150 is relayed to mobile device 128. Data received from external devices 150 may then be aggregated at mobile device 128 with data collected by mobile device 128, the aggregated data then transmitted to in-vehicle computing system 109 and touch screen 108 via communication link 130. Similar data aggregation may occur at a server system and then transmitted to in-vehicle computing system 109 and touch screen 108 via communication link 136/130.

Figure 2:
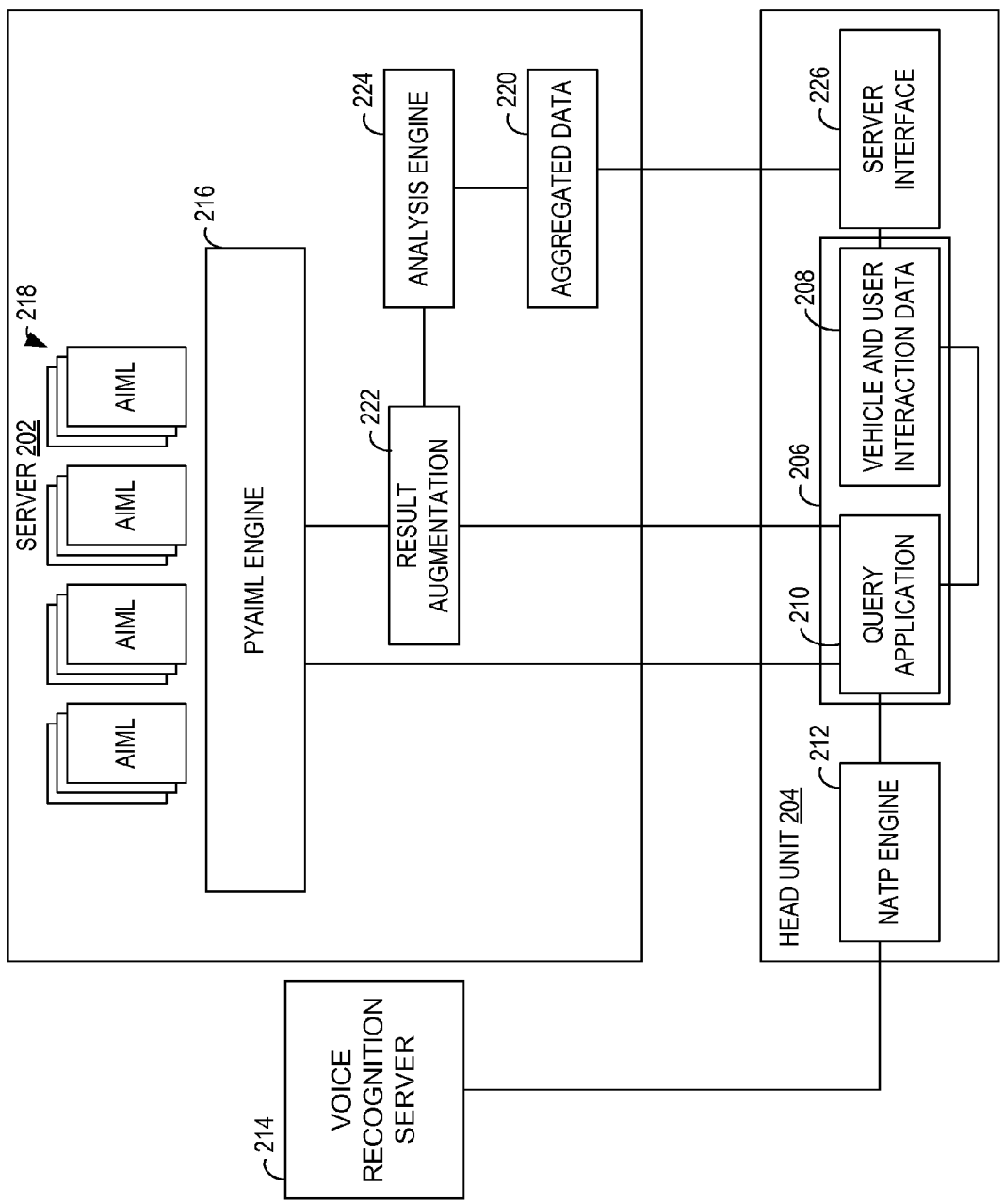
FIG. 2 shows a block diagram of a vehicle assistance system, in accordance with one or more embodiments of the present disclosure.

FIG. 2 shows example architecture for a vehicle assistance system including a query response server 202 and a head unit 204 in accordance with one or more embodiments of the disclosure. Head unit 204 may be an in-vehicle computing system (e.g., an infotainment system) integrated and/or mounted within a vehicle. For example, head unit 204 may be an example of in-vehicle computing system 109 of FIG. 1. Head unit 204 includes a storage device 206 for storing vehicle and user interaction data 208 in some embodiments, as well as instructions for executing a query application 210. In additional or alternative embodiments, vehicle and user interaction data 208 may be stored on an external storage device (e.g., within or communicatively connected with query response server 202) and/or temporarily stored in storage device 206 prior to being transmitted off-board to a storage device external to the head unit 204. Query application 210 may accept voice input, touch input to a touch-sensitive display screen of the head unit 204, and/or any other suitable user input to control a user interface of the application and provide responses to questions posed by the user. Upon receiving voice input (e.g., to a microphone of the head unit 204), the query application 210 may capture and pass the voice data (e.g., raw voice data or voice data with minimal processing for data transport purposes) to an onboard voice recognition client 212 or other communications interface. The voice data may then be transmitted (e.g., via a network) to a voice recognition server 214 external to the head unit 204. Although voice recognition is described as being performed off-board and/or externally to the head unit 204, it is to be understood that some or all of the voice recognition may be performed on-board and/or local to the head unit 204 in some embodiments.

Responsive to receiving the voice data from the head unit 204 representing a voice query, the voice recognition server translates and/or converts the voice data into text data to form a text query. The voice recognition server 214 may then send the text data forming the text query back to the query application 210 of the head unit 204 (e.g., via the onboard voice recognition client 212). Upon receiving the text query, the query application 210 may forward the text query to the query response server 202 for processing. In some embodiments, the query application may send the text query as a set of text data that is unchanged from the text data received from the voice recognition server, while in some embodiments the query application may perform pre-processing on the text data to format the text query for the query response server 202.

The query response server 202 includes a query matching engine 216 for parsing text queries and matching the text queries to a corresponding query stored in a matching markup language file, which may be an AIML (Artificial Intelligence Markup Language) file in some embodiments. The matching markup language files 218 include each supported query and, for each query, an associated response assigned to that query, as well as other markup language features, such as extensible markup language features including instruction for the display of the response and display of the any markers. In one example, the query matching engine 216 and/or the matching markup language files 218 include dialogs for queries and responses that may be received from a head unit. The queries may be interpreted based on application of fuzzy logic to match the text of the queries to a similar dialog in the matching markup language files. In this way, the query matching engine 216 may receive natural language queries and match the queries to responses as specified by the matching markup language files 218. In some examples, words related to a vehicle and/to vehicle context may be weighed more heavily within the fuzzy logic than other non-vehicle words. The responses may be presented in various forms corresponding to the type of response. The query matching engine 216 may implement a hierarchy algorithm in order to search for responses to questions within the matching markup language response files. Accordingly, the matching markup language engine and matching markup language files may be utilized to find contextual answers to a user's query (e.g., as translated into text via the voice recognition server) and/or ask a question so that the user may refine the query. Some matching markup language files may be specific to certain vehicles, while others may include information for all vehicle/head unit types. It is to be understood that the matching markup language files may be organized in any suitable manner.

In one example, a response may be a fully pre-defined response, which includes only static content that may be returned to a head unit and presented to a user without additional information. An example of a fully pre-defined response may be a response to a query regarding operation of the head unit. For example, if the query is "How do I mute the radio?", the response may be known based on static information corresponding to an operating manual of the head unit. Accordingly, the pre-defined response to such a query may include instructions on how to mute the radio (e.g., "Push the Volume and Mute control knob to mute the radio.") without requiring any further information from the query response server or head unit. For fully pre-defined responses, the query matching engine 216 may send the response directly to the query application of the head unit responsive to evaluating the response and determining that the server need not provide any further information for the response (e.g., determining that the response does not include a marker indicating information to be added).

A response may alternatively be a partially pre-defined response including one or more markers (also referred to herein as tokens or placeholders) for dynamic information that may be filled in using information local to the head unit. For example, a query may include the question: "How much fuel range do I have left?" The information necessary to quantify an answer to this question (e.g., information related to an amount of fuel left, an estimated fuel consumption rate, etc.) may be stored and/or available on the head unit. For example, the information utilized in a partially pre-defined response may be and/or rely upon real-time data accessible to the head unit via sensors of the vehicle. Accordingly, the response to such a query may include some pre-defined text as well as a marker serving as a placeholder for information that may be filled by the head unit (e.g., "You have <FUEL_RANGE> of fuel range remaining," where <FUEL_RANGE> is the marker). The marker may include an identifier for a particular sensor or a particular memory location corresponding to requested data. In such example responses, the query matching engine 216 may evaluate the response and send the response directly to the query application of the head unit without adding any information to the response. During the evaluation, the query matching engine 216 may determine that the marker does not correspond to markers that indicate information to be provided by the query response server (e.g., based on the characters preceding and following the marker text, such as the "< >" in the present example). Upon receipt of the response including the marker at the head unit 204, the query application 210 may request data from one or more sensors and/or a particular memory location in the vehicle and user interaction data 208 based on the marker text. Some markers may indicate an operation, such as a calculation, to be performed on data to determine a result to replace the marker when presenting the response to the user. For example, the <FUEL_RANGE> marker may indicate that a fuel range is to be calculated by performing a mathematical operation on data, such as a current amount of fuel and an average or estimated fuel economy. Such an operation may be performed at the head unit 204 and/or at the server 202. In some embodiments, some portions of the operation may be performed in one location (e.g., a head unit or other vehicle system), while other portions are performed in a different location (e.g., a server external to the vehicle).

Another example of a response that may be defined in a matching markup language file is a dynamic response that utilizes data local to or accessible by the query response server. For example, the query response server 202 may include and/or be communicatively connected to a database including aggregated data 220. Aggregated data 220 may include data from one or more head units that is collected at regular intervals (e.g., once per minute, once per five minutes, once per hour, etc.) and stored in a database. For example, data from numerous vehicles can be consolidated and aggregated to form aggregated data. While each vehicle may update its own information at regular intervals, the aggregated data may be updated at different interval, such as every 5 to 10 minutes, for example. In this way, the aggregated data 220 may be relatively up to date, but not in terms of data from the vehicle population, but may not be as up to date as data for a specific vehicle, such as the vehicle from which a query is initiated.

In one example, some databases may be designated for a particular head unit, vehicle, and/or user, while other databases may combine information from multiple head units to provide a collective view of information related to specific types of vehicle, head unit, users, etc. Databases that are specific to a particular head unit, vehicle, and/or user may include an identifier to designate the database accordingly, while collective databases may include identifiers relating to the types of information stored therein and/or the contexts associated with the stored information (e.g., the type of vehicle, user demographic, etc.).

An example of a query resulting in a dynamic response using data from the query response server may include: "How can I improve my gas mileage?" This query may be matched to a response in the matching markup language files 218, such as, "Based on your driving history, you can improve your miles-per-gallon by %%QUERY_MPG_FACTORS%%. The query matching engine 216 may parse the response and recognize the marker (e.g., based on the presence of the characters "%%" and/or the recognizable marker text "QUERY_MPG_FACTORS) as information that may be fulfilled based on data stored within the aggregated data 220. For example, based on the presence of the marker, the query matching engine 216 may send an identifier for the marker to the result augmentation engine 222, which may forward the marker and/or associated requested information identification to the analysis engine 224. The analysis engine 224 may identify the information requested by the marker and query the aggregated data for corresponding data. For the example query response detailed above, information that is specific to the vehicle in which the head unit 204 is located may be utilized to provide targeted information relating to the driving tendencies of the user and the status of the vehicle. In additional or alternative embodiments, information may be acquired from a collective database to target the information to the type of vehicle and/or to users that match the demographics of the driver.

Responsive to receiving the data, the analysis engine 224 may pass the data to the result augmentation engine 222 for insertion into the text response of the matching markup language to form an updated or post-processed response. For example, the post-processed response may include "Based on your driving history, you can improve your miles-per-gallon by accelerating more moderately and maintaining proper tire pressure." The data filing in the marker may thus be based on data specific to the vehicle from which the original query was generated (referred to as the originating vehicle)r, but also may be based on aggregated data from other drives of the same the type of vehicle (e.g., make and model, year, etc.) as the originating vehicle. Accordingly, the marker may be replaced with textual information received from aggregated data 220. In the example, above, the response may be based on a determination made by the analysis engine that the current pressure of the originating vehicle is less than a threshold (the threshold based on aggregated data from a plurality of other vehicles) and that in the past selected duration the vehicle operator of the originating vehicle has pressed the accelerator pedal at greater than a threshold rate greater than a threshold number of time.

Another example of responses provided by the matching markup language files includes dynamic responses using correlated data from the query response server. For such responses, further information may be acquired from the query response server to determine whether to use a tailored response or one or more pre-defined responses. Such responses may thus include multiple stages of processing and/or data acquisition from the server and/or head unit. An example query resulting in a dynamic response using correlated data may include: "How do I pair my BLUETOOTH device?" Such a query may be matched to a response of "%%CORRELATE_BT_PAIR%%" or a similar marker. The query matching engine 216 may recognize the marker and pass the marker along to the result augmentation engine 222 and/or the analysis engine 224 to acquire information related to the type of phone used by the user of the head unit. The aggregated data 220 may include such information, and the type of phone may be retrieved by the analysis engine 224. A post-processed response may include "It appears you are having problems pairing your [phone]. Would you like to hear steps specific to pairing this phone?", where [phone] is replaced by the particular make and/or model of phone that the user is attempting to pair. Accordingly, the response may prompt the user to provide a secondary query (e.g., a response to the question posed by the server). Depending upon the secondary query from the user (e.g., whether the user responds in the affirmative or in the negative), different follow-up responses may be provided to the user specific to the secondary query.

In the above example, the user may optionally provide a secondary query that requests the server/head unit to provide specific steps to pairing the phone. Accordingly, the server 202 may retrieve the steps (e.g., from the aggregated data and/or the matching markup language files), collect the steps in the result augmentation engine 222, and send the collected steps back to the head unit 204. The head unit may then present all steps to the user or present each step sequentially (e.g., according to a pre-defined time interval or in response to user input to progress through each step). The head unit may display the steps (e.g., highlighting each step as that step is reached) and/or output audio to audibly read the steps out to the user. The head unit may progress through to a new step upon determining that a previous step is completed (e.g., by detecting that the user performed a particular step using one or more sensors communicatively coupled to the head unit 204).

In some examples, information from the aggregated data 220 and the vehicle and user interaction data 208 may be utilized together to replace a marker within a response from the matching markup language files. For example, a response may include information that is derived from performing an operation on data received from the aggregated data 220 and the vehicle and user interaction data 208. The information from the vehicle and user interaction data 208 may be sent to the analysis engine 224 and/or result augmentation engine 222 for processing, or information may be sent from aggregated data 220 (e.g., via the result augmentation engine 222 or directly from the aggregated data 220) to the head unit (e.g., to the query application 210 directly or via the server interface 226).

In additional or alternative examples, multiple markers may be used within a matching markup language file, and one or more markers may indicate a request for information located in different locations from one another (e.g., a sensor or storage device local to the head unit and/or within the aggregated data 220). For example, a user may provide a voice query of "Where can I refuel?" The voice data associated with the voice query may be transmitted to the voice recognition server 214 and a text query corresponding to the voice query returned to the head unit 204. The text query may then be sent to the query matching engine 216, which accesses the matching markup language files 218 to find a matching response. For example, the matching markup language file for "Where can I refuel?" may include all or a subset of responses corresponding to queries concerning location data (e.g., based on the "where" interrogative) or similarly formatted queries. Accordingly, the matching markup language file including the response for "Where can I refuel?" may be a different matching markup language file than the matching markup language file including the response for "How do I mute the radio?", which may be an matching markup language file including all or a subset of queries concerning operation of the head unit 204 and/or vehicle.

After matching the query "Where can I refuel?" to a particular matching markup language file entry, the response corresponding to that entry may be returned to the Query matching engine. As the response for such a query may rely upon different information (e.g., instantaneous fuel range, historical data regarding preferred refueling stations, navigational data regarding route of vehicle, etc.), the response may include multiple markers, which may be directed to different areas of the server 202 and/or head unit 204. For example, the response may include a marker for historical data related to preferred refueling stations and their locations, which may be passed to the analysis engine 224. The marker may also include an operation to be performed to determine the distance to each refueling station based on a current or last-known location. The response may include another marker for a fuel range of the vehicle, which may be passed to the query application 210 and/or vehicle and user interaction data 208 of the head unit 204. One of the above-described markers and/or an additional marker may indicate an operation to be performed on the retrieved data. For example, a marker may designate that the refueling stations found by the analysis engine 224 are filtered such that only stations within the instantaneous fuel range indicated by the head unit 204 are included in the updated result formulated at the result augmentation block 222 and passed to the query application 210 for presentation to the user. In this way, multiple markers may be included in a particular response, indicating a request for data and/or operations to be performed by any suitable component of the server 202 and/or head unit 204.

Although markers which include a tag name between marker characters have been described above, it is to be understood that markers may have any suitable form and/or structure. For example, markers may include multiple tag names and/or organizational structures to enable more complex markers. For example, a marker may designate information related to a query, such as "%%Category:MPG, TYPE: QUERY, Attributes:FULL%%". In the above example, information pertaining to the query may be gleaned from different portions of the marker, such that the marker may invoke one or more particular blocks for retrieving relevant data to the marker.

Figure 3:
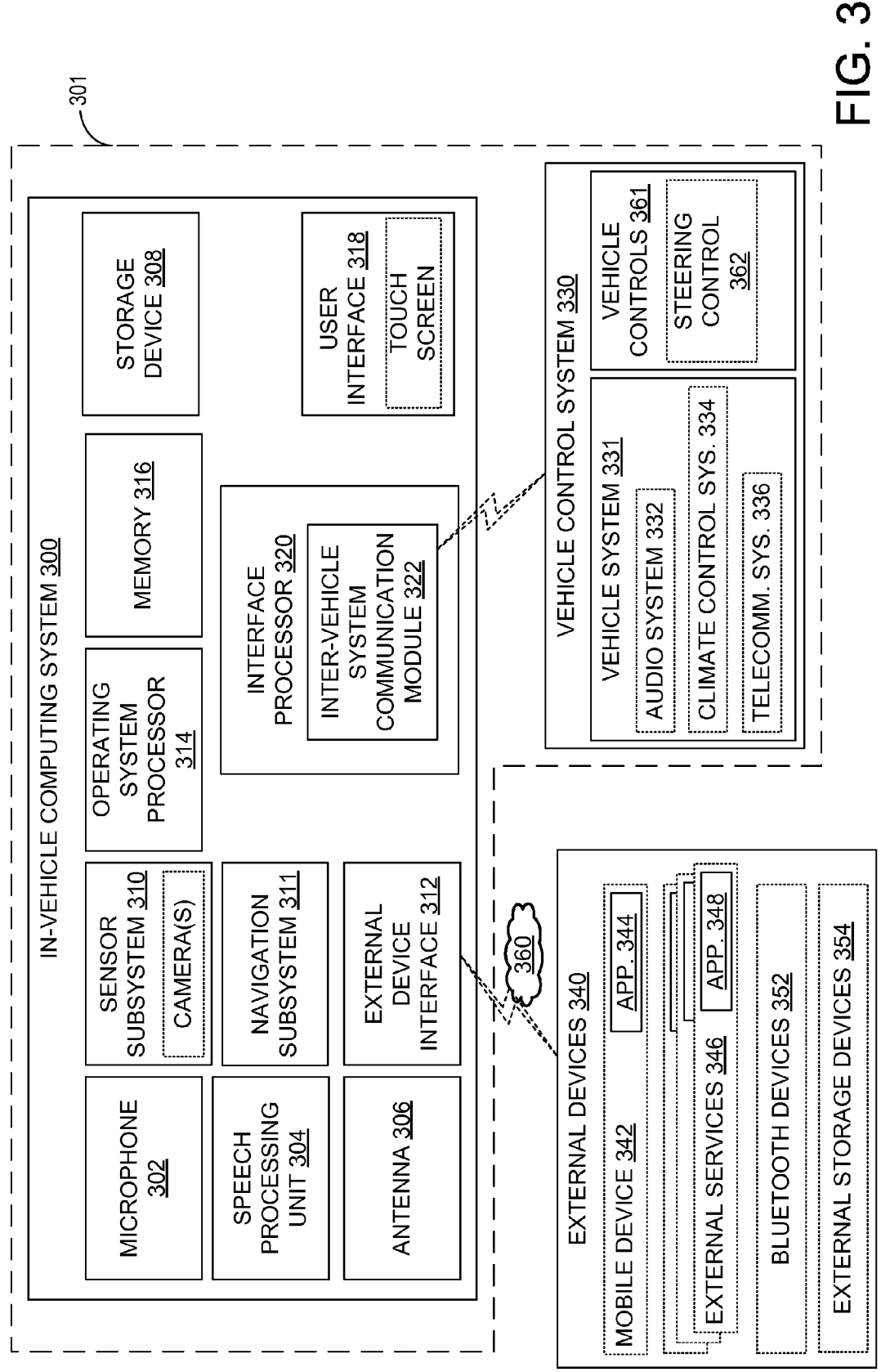
FIG. 3 shows a block diagram of an in-vehicle computing system, in accordance with one or more embodiments of the present disclosure.

FIG. 3 shows a block diagram of an in-vehicle computing system 300 configured and/or integrated inside vehicle 301. In-vehicle computing system 300 may be an example of in-vehicle computing system 109 of FIG. 1 in some embodiments. In some examples, the in-vehicle computing system may be a vehicle infotainment system configured to provide information-based media content (audio and/or visual media content, including entertainment content, navigational services, etc.) to a vehicle user to enhance the operator's in-vehicle experience. The vehicle infotainment system may include, or be coupled to, various vehicle systems, subsystems, hardware components, as well as software applications and systems that are integrated in, or integratable into, vehicle 301 in order to enhance an in-vehicle experience for a driver and/or a passenger.

In-vehicle computing system 300 may include one or more processors including an operating system processor 314 and an interface processor 320. Operating system processor 314 may execute an operating system on the in-vehicle computing system, and control input/output, display, playback, and other operations of the in-vehicle computing system. Interface processor 320 may interface with a vehicle control system 330 via an inter-vehicle system communication module 322.

Inter-vehicle system communication module 322 may output data to other vehicle systems 331 and vehicle control elements 361, while also receiving data input from other vehicle components and systems 331, 361, e.g. by way of vehicle control system 330. When outputting data, inter-vehicle system communication module 322 may provide a signal via a bus corresponding to any status of the vehicle, the vehicle surroundings, or the output of any other information source connected to the vehicle. Vehicle data outputs may include, for example, analog signals (such as current velocity), digital signals provided by individual information sources (such as clocks, thermometers, location sensors such as Global Positioning System [GPS] sensors, etc.), digital signals propagated through vehicle data networks (such as an engine controller area network [CAN] bus through which engine related information may be communicated, a climate control CAN bus through which climate control related information may be communicated, and a multimedia data network through which multimedia data is communicated between multimedia components in the vehicle). For example, the in-vehicle computing system may retrieve from the engine CAN bus the current speed of the vehicle estimated by the wheel sensors, a power state of the vehicle via a battery and/or power distribution system of the vehicle, an ignition state of the vehicle, etc. In addition, other interfacing means such as Ethernet may be used as well without departing from the scope of this disclosure.

A non-volatile storage device 308 may be included in in-vehicle computing system 300 to store data such as instructions executable by processors 314 and 320 in non-volatile form. The storage device 308 may store application data to enable the in-vehicle computing system 300 to run an application for connecting to and/or pairing with a mobile device and/or a wearable device. The storage device 308 may additionally or alternatively store application data to enable the in-vehicle computing system 300 to run an application for accepting user queries and providing responses, such as query application 210 as described with respect to FIG. 2. In-vehicle computing system 300 may further include a volatile memory 316. Volatile memory 316 may be random access memory (RAM). Non-transitory storage devices, such as non-volatile storage device 308 and/or volatile memory 316, may store instructions and/or code that, when executed by a processor (e.g., operating system processor 314 and/or interface processor 320), controls the in-vehicle computing system 300 to perform one or more of the actions described in the disclosure.

A microphone 302 may be included in the in-vehicle computing system 300 to receive voice commands and/or voice queries from a user and/or to measure ambient noise in the vehicle. A speech processing unit 304 may process the received voice data and/or the received voice data may be transmitted to an external voice recognition server located remotely to the vehicle and/or in-vehicle computing system 300. In some embodiments, in-vehicle computing system 300 may also be able to receive voice commands/queries and sample ambient vehicle noise using a microphone included in an audio system 332 of the vehicle.

One or more additional sensors may be included in a sensor subsystem 310 of the in-vehicle computing system 300. For example, the sensor subsystem 310 may include a camera, such as a rear view camera for assisting a user in parking the vehicle. Sensor subsystem 310 of in-vehicle computing system 300 may communicate with and receive inputs from various vehicle sensors and may further receive user inputs. For example, the inputs received by sensor subsystem 310 may include transmission gear position, transmission clutch position, gas pedal input, brake input, transmission selector position, vehicle speed, engine speed, mass airflow through the engine, ambient temperature, intake air temperature, etc., as well as inputs from climate control system sensors (such as heat transfer fluid temperature, antifreeze temperature, fan speed, passenger compartment temperature, desired passenger compartment temperature, ambient humidity, etc.), an audio sensor detecting voice commands issued by a user, a fob sensor receiving commands from and optionally tracking the geographic location/proximity of a fob of the vehicle, etc. While certain vehicle system sensors may communicate with sensor subsystem 310 alone, other sensors may communicate with both sensor subsystem 310 and vehicle control system 330, or may communicate with sensor subsystem 310 indirectly via vehicle control system 330. A navigation subsystem 311 of in-vehicle computing system 300 may generate and/or receive navigation information such as location information (e.g., via a GPS sensor and/or other sensors from sensor subsystem 310), route guidance, traffic information, point-of-interest (POI) identification, and/or provide other navigational services for the driver.

External device interface 312 of in-vehicle computing system 300 may be coupleable to and/or communicate with one or more external devices 340 located external to vehicle 301. While the external devices are illustrated as being located external to vehicle 301, it is to be understood that they may be temporarily housed in vehicle 301, such as when the user is operating the external devices while operating vehicle 301. For example, the external devices 340 are not integral to vehicle 301. The external devices 340 may include a mobile device 342 (e.g., connected via a Bluetooth connection) or an alternate Bluetooth-enabled device 352. Mobile device 342 may be a mobile phone, smart phone, wearable devices/sensors that may communicate with the in-vehicle computing system via wired and/or wireless communication, or other portable electronic device(s). Other external devices include external services 346, such as mash-up server 202 and telematics server 204 of FIG. 2. For example, the external devices may include extra-vehicular devices that are separate from and located externally to the vehicle. Still other external devices include external storage devices 354, such as solid-state drives, pen drives, USB drives, etc. External devices 340 may communicate with in-vehicle computing system 300 either wirelessly or via connectors without departing from the scope of this disclosure. For example, external devices 340 may communicate with in-vehicle computing system 300 through the external device interface 312 over network 360, a universal serial bus (USB) connection, a direct wired connection, a direct wireless connection, and/or other communication link. The external device interface 312 may provide a communication interface to enable the in-vehicle computing system to communicate with mobile devices associated with contacts of the driver. For example, the external device interface 312 may enable phone calls to be established and/or text messages (e.g., SMS, MMS, etc.) to be sent (e.g., via a cellular communications network) to a mobile device associated with a contact of the driver.

One or more applications 344 may be operable on mobile device 342. As an example, mobile device application 344 may be operated to aggregate user data regarding interactions of the user with the mobile device. For example, mobile device application 344 may aggregate data regarding music playlists listened to by the user on the mobile device, telephone call logs (including a frequency and duration of telephone calls accepted by the user), positional information including locations frequented by the user and an amount of time spent at each location, etc. The collected data may be transferred by application 344 to external device interface 312 over network 360. In addition, specific user data requests may be received at mobile device 342 from in-vehicle computing system 300 via the external device interface 312. The specific data requests may include requests for determining where the user is geographically located, an ambient noise level and/or music genre at the user's location, an ambient weather condition (temperature, humidity, etc.) at the user's location, etc. Mobile device application 344 may send control instructions to components (e.g., microphone, etc.) or other applications (e.g., navigational applications) of mobile device 342 to enable the requested data to be collected on the mobile device. Mobile device application 344 may then relay the collected information back to in-vehicle computing system 300.

Likewise, one or more applications 348 may be operable on external services 346. As an example, external services applications 348 may be operated to aggregate and/or analyze data from multiple data sources. For example, external services applications 348 may aggregate data from one or more social media accounts of the user, data from the in-vehicle computing system (e.g., sensor data, log files, user input, etc.), data from an internet query (e.g., weather data, POI data), etc. The collected data may be transmitted to another device, such as a query response server, and/or analyzed by the application to determine a context of the driver, vehicle, and environment.

Vehicle control system 330 may include controls for controlling aspects of various vehicle systems 331 involved in different in-vehicle functions. These may include, for example, controlling aspects of vehicle audio system 332 for providing audio entertainment to the vehicle occupants, aspects of climate control system 334 for meeting the cabin cooling or heating needs of the vehicle occupants, as well as aspects of telecommunication system 336 for enabling vehicle occupants to establish telecommunication linkage with others.

Audio system 332 may include one or more acoustic reproduction devices including electromagnetic transducers such as speakers for providing audio output to a driver and/or passengers of the vehicle. For example, the audio output may correspond to text-to-speech output providing audible responses to a user's query. Vehicle audio system 332 may be passive or active such as by including a power amplifier. In some examples, in-vehicle computing system 300 may be the only audio source for the acoustic reproduction device or there may be other audio sources that are connected to the audio reproduction system (e.g., external devices such as a mobile phone). The connection of any such external devices to the audio reproduction device may be analog, digital, or any combination of analog and digital technologies.

Climate control system 334 may be configured to provide a comfortable environment within the cabin or passenger compartment of vehicle 301. Climate control system 334 includes components enabling controlled ventilation such as air vents, a heater, an air conditioner, an integrated heater and air-conditioner system, etc. Other components linked to the heating and air-conditioning setup may include a windshield defrosting and defogging system capable of clearing the windshield and a ventilation-air filter for cleaning outside air that enters the passenger compartment through a fresh-air inlet.

Vehicle control system 330 may also include controls for adjusting the settings of various vehicle controls 361 (or vehicle system control elements) related to the engine and/or auxiliary elements within a cabin of the vehicle, such as steering wheel controls 362 (e.g., steering wheel-mounted audio system controls, cruise controls, windshield wiper controls, headlight controls, turn signal controls, etc.), instrument panel controls, microphone(s), accelerator/brake/clutch pedals, a gear shift, door/window controls positioned in a driver or passenger door, seat controls, cabin light controls, audio system controls, cabin temperature controls, etc. The control signals may also control audio output at one or more speakers of the vehicle's audio system 332. For example, the control signals may adjust audio output characteristics such as volume, equalization, audio image (e.g., the configuration of the audio signals to produce audio output that appears to a user to originate from one or more defined locations), audio distribution among a plurality of speakers, etc. Likewise, the control signals may control vents, air conditioner, and/or heater of climate control system 334. For example, the control signals may increase delivery of cooled air to a specific section of the cabin.

Control elements positioned on an outside of a vehicle (e.g., controls for a security system) may also be connected to computing system 300, such as via communication module 322. The control elements of the vehicle control system may be physically and permanently positioned on and/or in the vehicle for receiving user input. In addition to receiving control instructions from in-vehicle computing system 300, vehicle control system 330 may also receive input from one or more external devices 340 operated by the user, such as from mobile device 342. This allows aspects of vehicle systems 331 and vehicle controls 361 to be controlled based on user input received from the external devices 340.

In-vehicle computing system 300 may further include an antenna 306. Antenna 306 is shown as a single antenna, but may comprise one or more antennas in some embodiments. The in-vehicle computing system may obtain broadband wireless internet access via antenna 306, and may further receive broadcast signals such as radio, television, weather, traffic, and the like. The in-vehicle computing system may receive positioning signals such as GPS signals via one or more antennas 306. The in-vehicle computing system may also receive wireless commands via RF such as via antenna(s) 306 or via infrared or other means through appropriate receiving devices. In some embodiments, antenna 306 may be included as part of audio system 332 or telecommunication system 336. Additionally, antenna 306 may provide AM/FM radio signals to external devices 340 (such as to mobile device 342) via external device interface 312.

One or more elements of the in-vehicle computing system 300 may be controlled by a user via user interface 318. User interface 318 may include a graphical user interface presented on a touch screen, such as touch screen 108 of FIG. 1, and/or user-actuated buttons, switches, knobs, dials, sliders, etc. For example, user-actuated elements may include steering wheel controls, door and/or window controls, instrument panel controls, audio system settings, climate control system settings, and the like. A user may also interact with one or more applications of the in-vehicle computing system 300 and mobile device 342 via user interface 318. In addition to receiving a user's vehicle setting preferences on user interface 318, vehicle settings selected by in-vehicle control system may be displayed to a user on user interface 318. Notifications and other messages, as well as navigational assistance, may be displayed to the user on a display of the user interface. The user interface 318 may also include information to enable a user to present queries and receive responses while a query application, such as query application 210 of FIG. 2 is being executed by the in-vehicle computing system 300.

Figure 4:
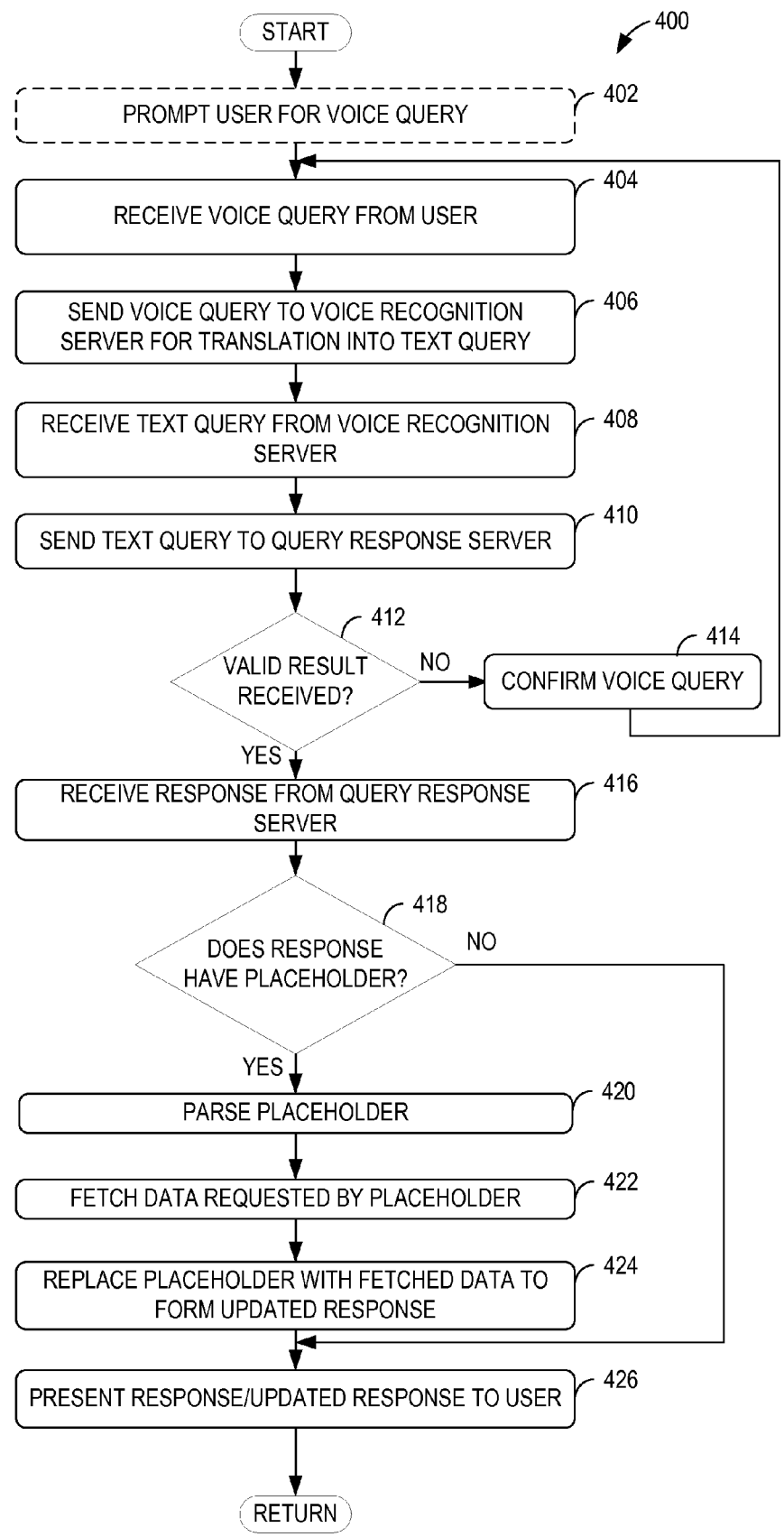
FIG. 4 is a flow chart of a method for receiving a query at a head unit and presenting a response to the query at the head unit, in accordance with one or more embodiments of the present disclosure.

FIG. 4 is a method 400 for receiving a query at a head unit (e.g., head unit 204 of FIG. 2) and presenting a response to the query at the head unit. At 402, the method 400 optionally includes prompting a user for a voice query. For example, upon launching a query application on the head unit, the query application may output a visual and/or audible cue to the user requesting a query from the user, such as "Ask me a question about your vehicle" or "How may I assist you today?" At 404, the method 400 includes receiving a voice query from a user (e.g., voice data received via a microphone communicatively connected to the head unit including a query posed by the user).

The method 400 includes sending the voice query to a voice recognition server (e.g., a voice recognition server external to the head unit) for translation into a text query, as indicated at 406. The head unit may then receive the text query from the voice recognition server, as indicated at 408. At 410, the method 400 includes sending the text query to the query response server (e.g., query response server 202 of FIG. 2). Although the method 400 relates to utilizing a query response server to determine a response for a query, it is to be understood that some or all of the processing to the text query to determine an associated response may be performed on the head unit and/or may be attempted on the head unit prior to sending the text query to the query response server. At 412, the method 400 includes determining if a valid result for the query is received from the query response server. If a valid result for the query is not received (e.g., "NO" at 412), the method 400 may proceed to 414 to confirm the voice query (e.g., by repeating the question audibly and/or visually to the user). If the voice query is confirmed at 414, the method 400 may return to 404 to receive another voice query from the user, optionally after displaying an indication to the user that the last query was not valid/recognized. If the last query was not valid and/or recognized, a reason for such an error may be provided, such as a loss of connectivity to the server, a lack of a match for the voice query in the matching markup language files, etc.

If a valid result to the query submission was received (e.g., "YES" at 412), the method 400 includes receiving a response from the query response server at 416. At 418, the method 400 includes determining if the response includes a placeholder (e.g., a marker having a tag and/or text that is recognizable by the head unit as being associated with data that is to be acquired and inserted by the head unit). For example, the placeholder may be identified by parsing and/or otherwise analyzing the response from the query response server and comparing portions of the response to a table or list of recognized identifiers (e.g., sensor names, memory locations, etc.) and/or recognized delimiters (e.g., character/symbol/string indicating the presence of a placeholder/indicating a separation between the text and the placeholder). The response may be determined to include a placeholder if at least one identifier and/or delimiter is matched to the recognized list/table of identifiers/delimiters. If the response includes a placeholder (e.g., "YES" at 418), the method 400 proceeds to 420 to parse the placeholder and to 422 to fetch data requested and/or identified by the placeholder. For example, the placeholder may include text that may be translated into a memory location for a local database in the head unit that holds data to be inserted into the response in the location of the placeholder. At 424, the method 400 includes replacing the placeholder with the fetched data to form an updated response. At 426, the method 400 includes presenting the updated response to the user (e.g., visual and/or audibly). If the response does not include a placeholder (e.g., "NO" at 418), the method proceeds directly to 426 to present the response to the user.

Figure 5:
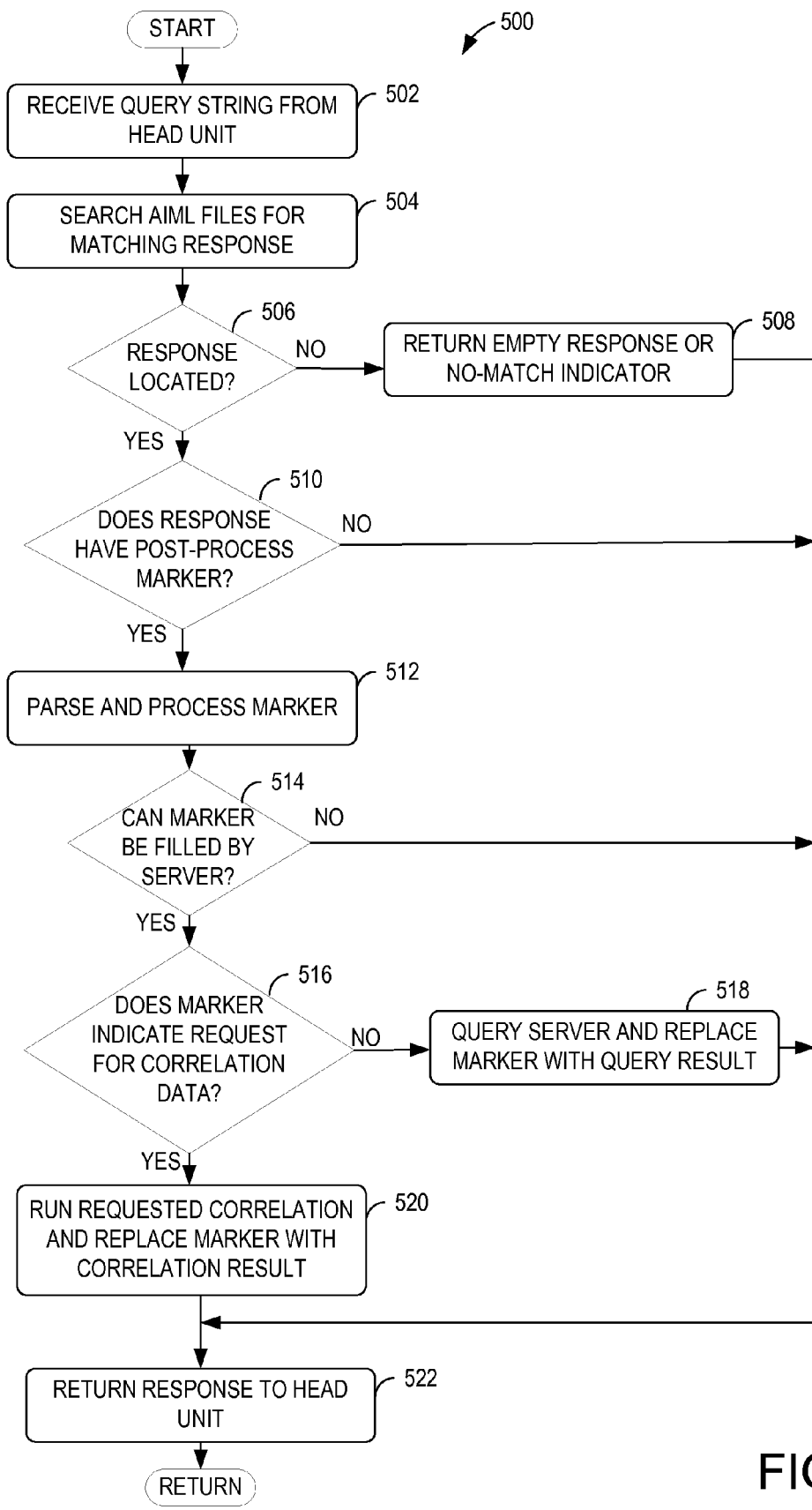
FIG. 5 is a flow chart of a method for determining a response to a query from a head unit and providing the response to the head unit, in accordance with one or more embodiments of the present disclosure.

As described above with respect to FIG. 4, the head unit may send information related to a query from a user to a query response server to receive a response to the query. FIG. 5 is a flow chart of a method 500 of determining a query response at a query response server (e.g., query response server 202 of FIG. 2). At 502, the method 500 includes receiving a query string from a head unit. For example, the query string may be a text string representing a voice query received at the head unit. At 504, the method 500 includes searching matching markup language files for a response that matches the query string. The method 500 includes determining if a response is located at 506. If no response is located (e.g., "NO" at 506), the method 500 includes returning an empty response or no-match indicator, as indicated at 508. The method then proceeds to 522 to return the response (e.g., the empty response or no-match indicator) to the head unit. If a response is located (e.g., "YES" at 506), the method 500 includes determining if the response includes a post-process marker, as indicated at 510. If the response does not include a post-process marker (e.g., "NO" at 510), no further processing is necessary at the server, and the method proceeds to 522 to return the response to the head unit.

If the response does include a post-processor marker (e.g., "YES" at 510), the method proceeds to 512 to parse and process the marker. For example, the tag (e.g., characters preceding and following the marker identifier) and/or identifier of the marker may be evaluated by a query matching engine of the server to determine whether the marker can be filled by the server, as indicated at 514. If the marker cannot be filled by the server (e.g., if the marker is not recognized as corresponding to data that is retrievable by the server, "NO" at 514), the method 500 proceeds to 522 to return the response to the head unit. Otherwise, if the marker can be filled by the server (e.g., "YES" at 514), the method 500 includes determining if the marker indicates a request for correlation data at 516. As described above with respect to FIG. 2, a request for correlation data may be included in a response that relies upon follow-up and/or clarifying queries presented to the user and/or data that is combined from multiple sources (e.g., from a database that is local and/or directly accessible by the server and data that is local and/or directly accessible by the head unit). If the marker does not indicate a request for correlation data (e.g., "NO" at 516), the marker may indicate a request for a server query to acquire data from a database local to the query response server. Accordingly, the method 500 proceeds to 518 to query the server and replace the marker with the query result. For example, such a response may correspond to the dynamic responses utilizing aggregated data as described above with respect to FIG. 2.

If the marker indicates a request for correlation data (e.g., "YES" at 516), the method 500 proceeds to 520 to run the requested correlation and replace the marker with the correlation result. Upon replacing the marker, either with the query result at 518 or the correlation result at 520, the method 500 proceeds to return the response to the head unit at 522.

Figure 6A:
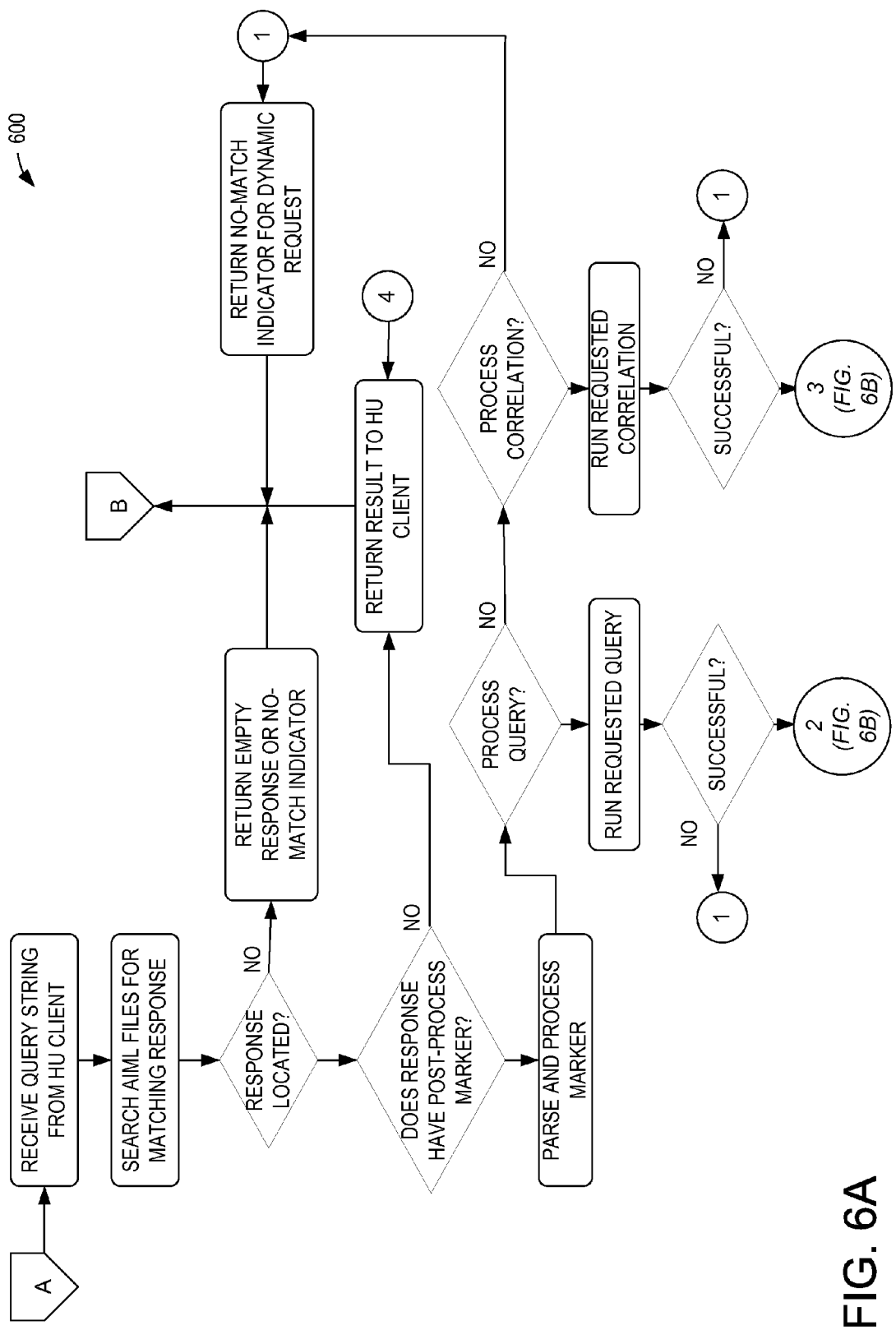
FIGS. 6A and 6B are flow charts of a method for responding to queries in a server system, in accordance with one or more embodiments of the present disclosure.
Figure 6B:
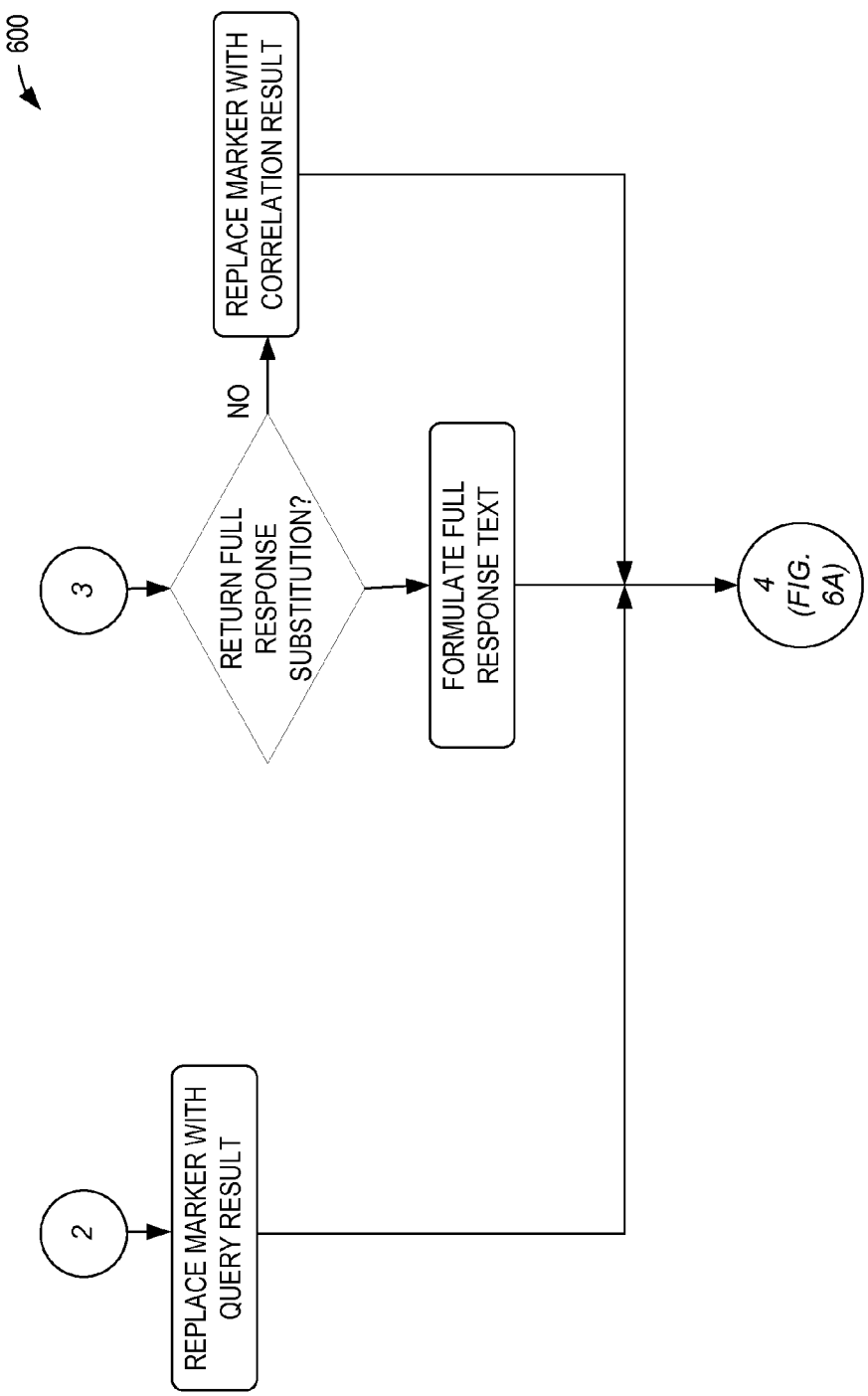

FIGS. 6A and 6B are flow charts of a method 600 for responding to queries in a server system. The method 600 includes searching matching markup language files for a response that matches a query received from a client of a head unit, as described in more detail above. The method 600 may include processing markers differently based on the type of marker received, and substituting either an entire response that is returned from the matching markup language files or a portion of the response with data retrieved from a query or correlation request. Voice data may be sent to be processed to an off-board voice to text engine and/or voice recognition server. The speech input may then be returned in text form, and an application on the head unit may send the text to a query response server where it is interpreted by a matching markup language parser. The output of the parser is then processed in the cloud for tags that the cloud knows how to replace with relevant data. The final string is then sent to the head unit application where it parsed further and formatted for the type of response it is. Tags are searched for and replaced with data that must be derived from the vehicle bus or head unit.

Figure 7A:
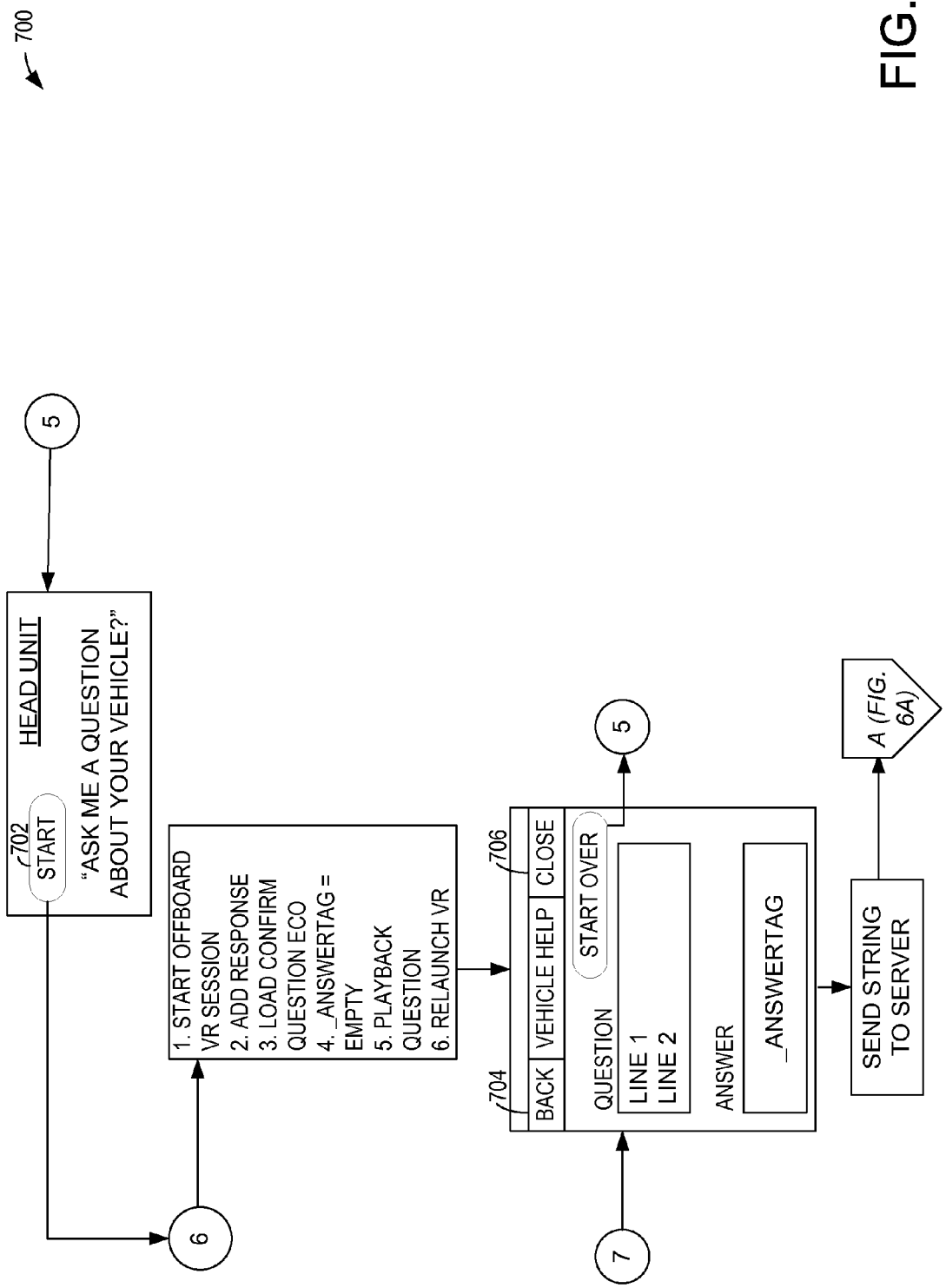
FIGS. 7A-7C are flow charts of a method for responding to queries in a head unit, in accordance with one or more embodiments of the present disclosure.
Figure 7B:
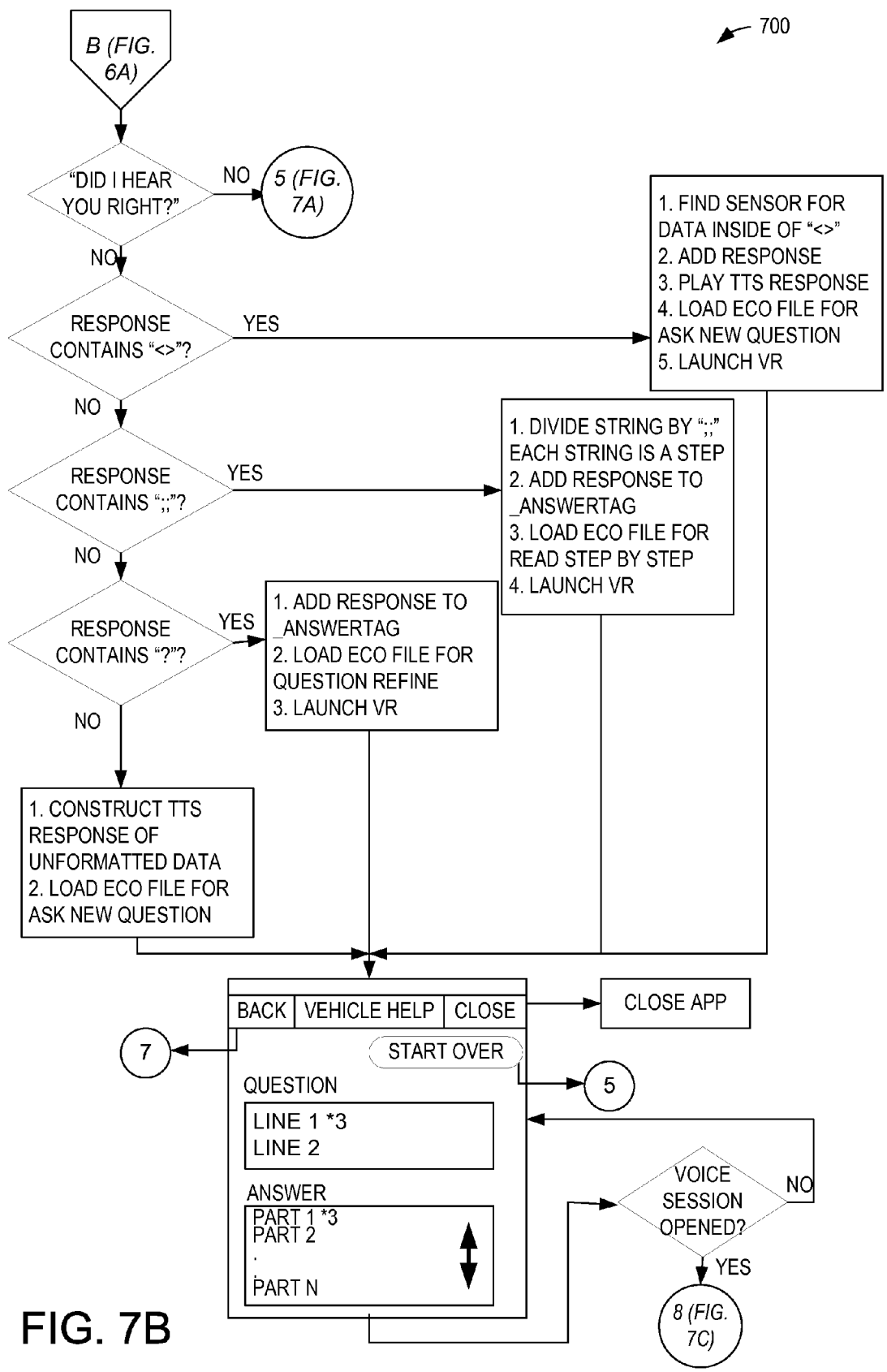
Figure 7C:
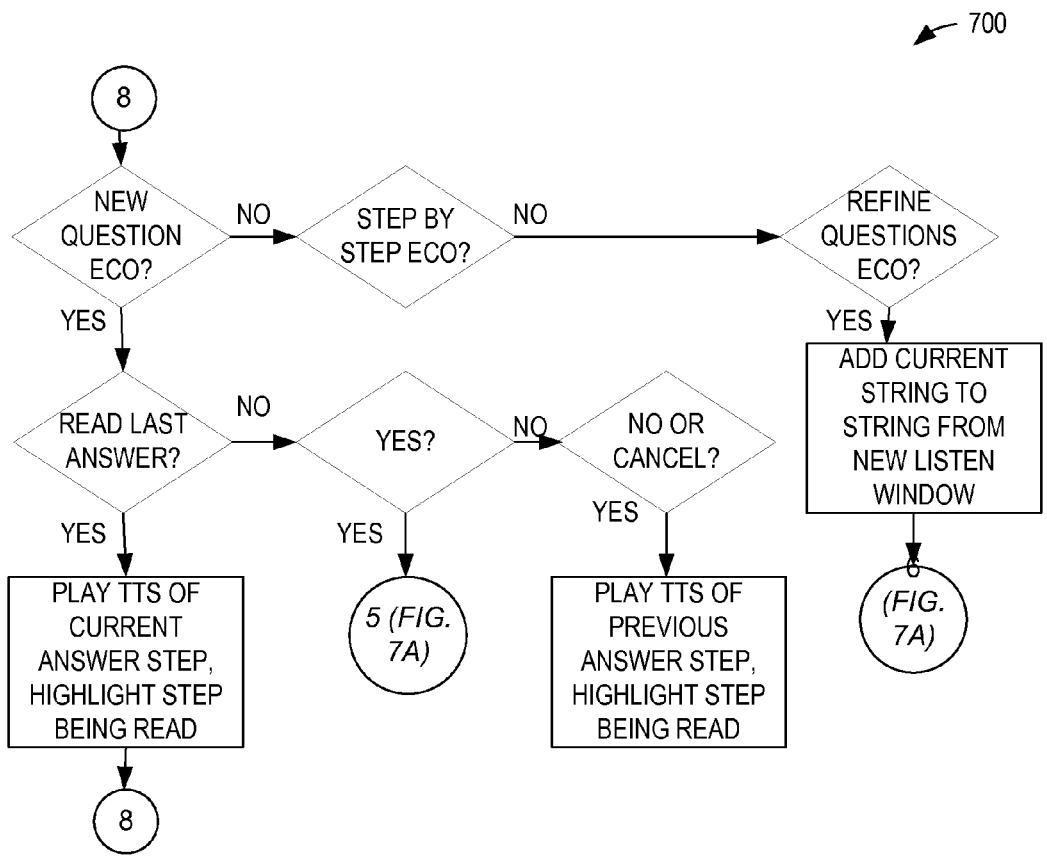

FIGS. 7A-7C are flow charts of a method 700 for responding to queries in a head unit, in accordance with one or more embodiments of the present disclosure. The flow charts schematically show elements that may be represented in a user interface of a query assistance application, such as a start button 702 to initiate a query sequence, a back button 704 to return to a previous screen, and a close button 706 to exit a query sequence and/or the query assistance application. The method 700 also includes identifying different tags and/or markers that may be included in a response from a query response server in order to determine a type of response substitution to be performed.

For example, a tag of "< >" may indicate that sensor data corresponding to an identifier contained between the "<" and the ">" is to be fetched and used to replace the tag. A tag of ";;" may indicate that the response includes help information, the ";;" being used as a delimiter to indicate breaks between steps of the help information. For example, the ";;" may be interpreted by the head unit as a pause, such that the step following the ";;" is not displayed or audibly presented (e.g., after being sent to a text-to-speech conversion unit local or remote to the head unit) to the user until a specified time and/or until the user has completed the previous step. A tag of "?" may indicate that more information is needed to respond to the query. For example, if only one word of the query was recognized by the query matching engine, and that word corresponds to multiple possible responses, the "?" may indicate that the head unit is to prompt the user for more information. It is to be understood that the example tags and associations described above are exemplary in nature, and any suitable tag and tag to operation/instruction association may be utilized.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the in-vehicle computing system 109 and/or query response server 202 described with reference to FIGS. 1 and 2. As another example, one or more of the described methods (e.g., the methods described in FIGS. 6A-7C) may be performed by executing stored instructions with a processor (e.g., operating system processor 314 and/or interface processor 320 of FIG. 3) of an in-vehicle computing system in combination with one or more other hardware devices (e.g., microphone 302, antenna 306, vehicle system 331, and/or any other suitable device illustrated in FIG. 3 or described in this disclosure). The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. It is to be understood that example queries, responses, and other inputs and outputs to the system described above are exemplary and are not intended to be exhaustive. Additional or alternative phrasing, query-to-response matching, marker syntax, and other features may be provided by the systems and methods described in the above disclosure. The following claims particularly point out subject matter from the above disclosure that is regarded as novel and non-obvious.

The invention claimed is:

1. An in-vehicle computing system of a vehicle, the in-vehicle computing system comprising:
 a communication interface communicatively coupled to a query response server;
 a processor; and
 a storage device, the storage device configured to collect and store vehicle and user interaction data and configured to store instructions executable by the processor to:
  receive a voice query from a user;
  translate the voice query into a text query;
  send the text query to the query response server;
  receive, at the in-vehicle computing system, a result from the query response server, the result including information from the query response sever and one or more placeholders representing additional information to be retrieved from a storage device local to the in-vehicle computing system;
  replace the one or more placeholders with information from the storage device to form an updated result; and
  present the updated result to the user.

2. The in-vehicle computing system of claim 1, further comprising an inter-vehicle system communication module configured to communicate with one or more vehicle systems via a Controller Area Network (CAN) bus of the vehicle, and wherein the instructions are further executable to replace the one or more placeholders with information from a sensor of the vehicle received via the CAN bus.

3. The in-vehicle computing system of claim 1, wherein translating the voice query into a text query includes sending the voice query to a voice recognition server external to the vehicle, and wherein the result from the query response server includes predefined text in addition to the one or more placeholders representing additional text to be filled in with data retrieved from the storage device local to the in-vehicle computing system.

4. An in-vehicle computing system comprising:
   a communication interface communicatively coupled to a query response server;
   a processor; and
   a storage device, the storage device configured to collect and store vehicle and user interaction data for a vehicle and configured to store instructions executable by the processor to:
      receive a voice query from a user;
      send the voice query to a voice recognition server;
      receive a text query from the voice recognition server;
      send the text query to the query response server;
      receive, at the in-vehicle computing system, a result from the query response server, the result including information from the query response server and requesting additional information included in the vehicle and user interaction data;
      send the requested additional information to the query response server;
      receive an updated result from the query response server; and
      present the updated result to the user.

5. The in-vehicle computing system of claim 4, further comprising a display device and wherein presenting the updated result to the user comprises displaying the updated result to the user.

6. The in-vehicle computing system of claim 4, wherein receiving the result from the query response server comprises receiving a result from matching the text query to one of a plurality of text queries located in one or more Artificial Intelligence Markup Language (AIML) files associated with one or more pre-defined responses.

7. The in-vehicle computing system of claim 6, wherein the one or more pre-defined responses includes information for the text query in addition to a marker serving as a placeholder for data to be retrieved by one or more of the in-vehicle computing system and the query response server.

8. The in-vehicle computing system of claim 7, wherein the marker is recognizable by the query response server as identifying data that is stored in a storage device that is local to the query response server.

9. The in-vehicle computing system of claim 7, wherein the marker is recognizable by the query response server as identifying data that is stored in a storage device that is local to the in-vehicle computing system.

10. The in-vehicle computing system of claim 7, wherein the marker is recognizable by the query response server as identifying a correlation request for correlating data in one or more of a storage device local to the query response server and a storage device local to the in-vehicle computing system.

11. A method in an in-vehicle computing system within a passenger compartment of a vehicle, the method comprising:
    receiving a voice query from a user;
    translating the voice query into a text query;
    sending the text query to a query response server;
    receiving, at the in-vehicle computing system, a result from the query response server, the result including information for the text query and one or more placeholders representing additional information for the text query to be retrieved from a storage device local to the in-vehicle computing system;
    replacing the one or more placeholders with information from the storage device to form an updated result; and
    presenting the updated result to the user.

12. The method of claim 11, further comprising prompting the user for the voice query.

13. The method of claim 11, further comprising determining if the result from the query response server is a valid result corresponding to a response to the voice query.

14. The method of claim 13, further comprising confirming the voice query responsive to determining that the result from the query response server is not a valid result.

15. The method of claim 11, further comprising fetching data requested by the one or more placeholders by querying a sensor identified by the one or more placeholders.

16. A method, comprising:
    recording vehicle information for a vehicle onboard the vehicle;
    responsive to a voice request, sending a representation of the voice request and the recorded vehicle information to a remote server;
    receiving, from the remote server, a response to the voice request, the response including a marker and aggregated data from one or more other vehicles;
    updating the response with additional information retrieved from onboard the vehicle responsive to the marker; and
    presenting the updated response in the vehicle.

17. The method of claim 16, wherein the updating includes performing one or more calculations according to a formula represented by the marker with the onboard vehicle data.

18. The method of claim 16, wherein the updating includes performing one or more calculations according to a formula represented by the marker with the aggregated vehicle data, the updating performed in the vehicle.

19. The method of claim 16 wherein the representation is in the form of human readable text.

* * * * *